United States Patent [19]

Bentley

[11] 4,418,663
[45] Dec. 6, 1983

[54] ROTARY ENGINE

[76] Inventor: Arthur P. Bentley, P.O. Box 1952, Roswell, N. Mex. 88201

[21] Appl. No.: 332,539

[22] Filed: Dec. 21, 1981

[51] Int. Cl.³ ............................................. F02B 53/00
[52] U.S. Cl. .................................... 123/243; 418/173
[58] Field of Search ................ 123/243, 213; 418/173, 418/101

[56] References Cited

U.S. PATENT DOCUMENTS

| | | | |
|---|---|---|---|
| 1,209,204 | 12/1916 | Richards | 418/101 X |
| 2,302,254 | 11/1942 | Rhine | 123/202 |
| 3,529,909 | 9/1970 | Klover | 418/173 |
| 3,723,033 | 3/1973 | Tauscher | 123/243 X |

Primary Examiner—Michael Koczo
Assistant Examiner—Peggy A. Loiacano
Attorney, Agent, or Firm—Herbert E. Haynes, Jr.

[57] ABSTRACT

A radial internal combustion engine having a rotor of the radially movable vane type eccentrically housed within a rotor chamber casing both of which are journalled for rotation within an engine housing. Combustion induced rotation of the rotor is coupled by a gear train to the rotor chamber casing for driving the rotor chamber casing at the same speed as the rotor. Impeller blades provided on the periphery of the rotor chamber casing are employed to supercharge the fuel mixture prior to its being directed into the volumetrically expandable and contractable combustion chambers provided about the periphery of the rotor.

10 Claims, 5 Drawing Figures

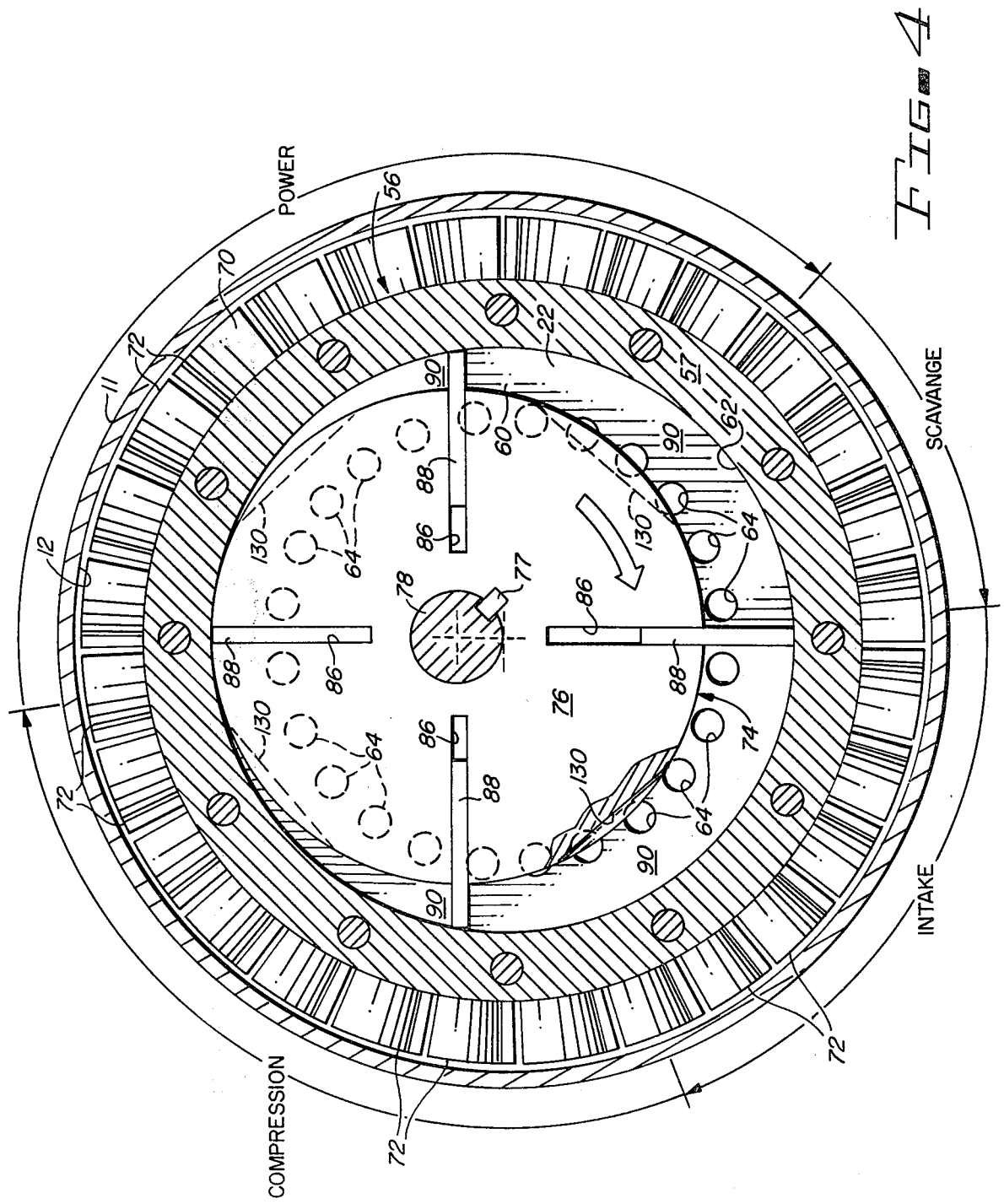

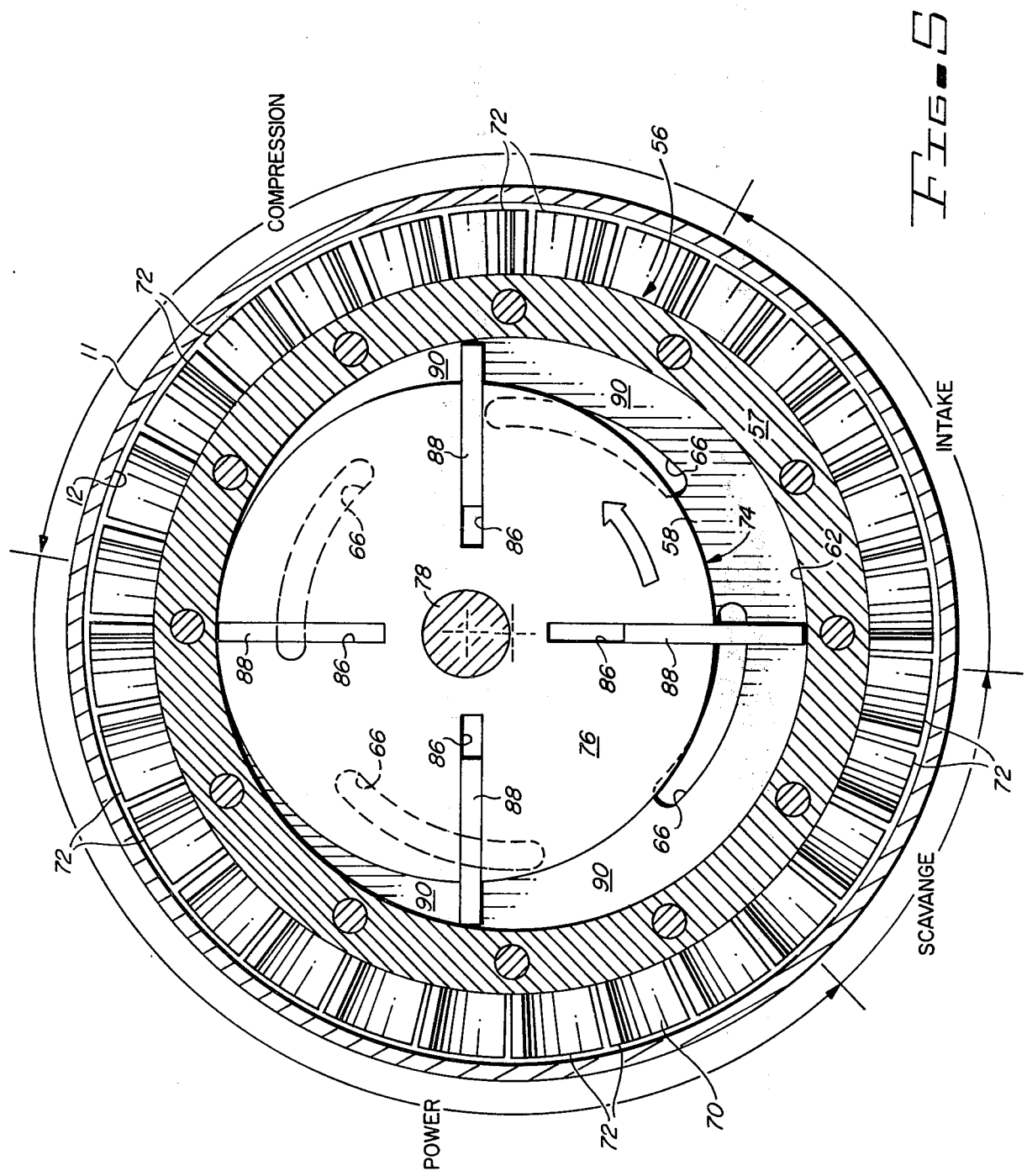

4,418,663

ROTARY ENGINE

BACKGROUND OF THE INVENTION

1. Field of the Invention

This invention relates generally to internal combustion engines and more particularly to a rotary internal combustion engine.

2. Description of the Prior Art

Many attempts have been made to devise an internal combustion engine of the type commonly referred to as a rotary engine due to its rotational operation as distinguished from the reciprocal operation of the more conventional piston-type engines.

In general, rotary engines include a rotor carried eccentrically within a fixed casing which defines the rotor chamber. The periphery of the rotor is divided, such as with radially extensible and retractable vanes, into plural segments each of which defines a combustion chamber. The plural combustion chambers are continuously changing in volume, i.e., expanding and contracting, as the rotor revolves eccentrically in the fixed rotor chamber casing, so that with proper porting, among other things, the rotary engine is capable of performing the necessary internal combustion engine functions of; fuel intake, compression, combustion and exhaust. The radially movable vanes provided at spaced increments about the periphery of the rotor must form a seal with the endless inner wall of the rotor chamber casing to sealingly divide the rotating combustion chambers from each other so that the different ones of the internal combustion engine functions can occur simultaneously in adjacent combustion chambers.

Combustion chamber sealing is a problem which has kept many of the prior art radial engines from becoming commercially acceptable. The high operating pressures and temperatures causes rapid wear of the seals which, when they become worn, allow the escape, or blow by, of the gasses, and form chatter marks on the endless inner sidewall of the rotor chamber casing. This, of course, results in a loss of engine performance and if not corrected quickly can damage, and in severe cases, ruin the rotor chamber casing.

The well known Wankel engine, although having achieved commercial acceptance, experienced considerable combustion chamber sealing problems which, even after extensive and costly research and development, remains a weak spot in the engine. The Wankel engine has a generally triangularly shaped rotor and a rotor chamber casing having its inner wall especially configured in a shape which is derived from a group of curves generally called trochoids. These special rotor and casing configurations place the three lobes, or tips, of the rotor in constant engagement with the endless inner wall of the rotor chamber casing without the need for radial movement as is the case in the prior art vane-type rotary engines. Although the very exotic and expensive tip seals developed for the Wankel engine are capable of withstanding the high operating pressures and temperatures of the engine, they are still subjected to high frictional wear which results in a relatively rapid wear rate.

Therefore, a need exists for a new and improved radial engine which overcomes, or at least substantially reduces, the problems of the prior art.

SUMMARY OF THE INVENTION

In accordance with the present invention, a new and improved radial engine is disclosed as including a rotor of the radially movable vane-type and a rotor chamber casing both of which are journalled for rotation within an engine housing. The rotor is fixedly carried on a coaxial shaft and rotates about an axis of revolution which is eccentric with respect to the rotational axis of the rotor chamber casing. The power output end of the rotor shaft is coupled by means of a gear train to the rotor chamber casing to provide feed-back rotational driving of the rotor chamber casing at speeds which match that of the rotor. The eccentric relationship of the rotational axes of the rotor and rotor chamber casing provide the necessary volumetric changes of the combustion chambers in the same manner as similar prior art structures, but, since both of these components revolve at the same speed, there is minimal relative rotational movement therebetween. Thus, the prior art problem of relatively rapid seal wear resulting from friction is substantially reduced.

The rotor chamber casing is of cylindrical configuration with its opposite ends being closed by end plates one of which is provided with fuel intake ports and the other is provided with exhaust ports. The engine housing is formed with a cylindrical rotation chamber in which the rotor and rotor chamber casing are rotatably carried. The rotation chamber of the engine housing is provided with end closing members which are suitably ported for directing the flow of incoming fuel and spent exhaust gasses in conjunction with the end closing plates of the rotor chamber casing. The cylindrical rotation chamber of the engine housing is sized so that its inside diameter is larger than the outside diameter of the rotor chamber casing to provide an annular passage through which the incoming fuel mixture is passed on its way to the combustion chambers provided about the periphery of the rotor. A plurality of radially extending impeller blades are provided on the periphery of the rotor chamber casing which serve to supercharge the fuel as it passes through the annular passage and thus, pressurize the fuel that is supplied to the combustion chambers.

The rotary engine of the present invention can be configured so as to operate as a diesel engine, or alternately, may be configured to operate in a manner of a gasoline powered engine.

Accordingly, it is an object of the present invention to provide a new and improved rotary internal combustion engine.

Another object of the present invention is to provide a new and improved rotary internal combustion engine which substantially reduces frictional wear of the rotor sealing elements.

Another object of the present invention is to provide a new and improved rotary internal combustion engine which supercharges the incoming fuel mixture.

Another object of the present invention is to provide a new and improved rotary internal combustion engine which may be configured as a diesel engine or as a gasoline powered engine.

Another object of the present invention is to provide a new and improved rotary internal combustion engine including a rotor eccentrically positioned within a rotor chamber casing both of which are separately journalled for rotation within an engine housing and revolve at the same speed to substantially reduce the friction induced rotor seal wear problem of the prior art.

Another object of the present invention is to provide a rotary internal combustion engine of the above described character which includes a feed-back gear train coupled between the output shaft of the rotor and the rotor chamber casing to rotatably drive the rotor chamber casing at speeds which match that of the rotor.

Another object of the present invention is to provide a rotary internal combustion engine of the above described character wherein a plurality of impeller blades are mounted on the periphery of the rotor chamber casing so as to extend radially into an annular fuel passage chamber provided between the rotor chamber casing and the engine housing to supercharge the fuel which passes therethrough on its way to the combustion chambers provided about the periphery of the rotor.

The foregoing and other objects of the present invention, as well as the invention itself, may be more fully understood from the following description when read in conjunction with the accompanying drawings.

BRIEF DESCRIPTION OF THE DRAWINGS

FIG. 4 is a sectional view taken along the line 4—4 of FIG. 1.

FIG. 5 is a sectional view taken along the line 5—5 of FIG. 1.

DESCRIPTION OF THE PREFERRED EMBODIMENT

Figure 1:
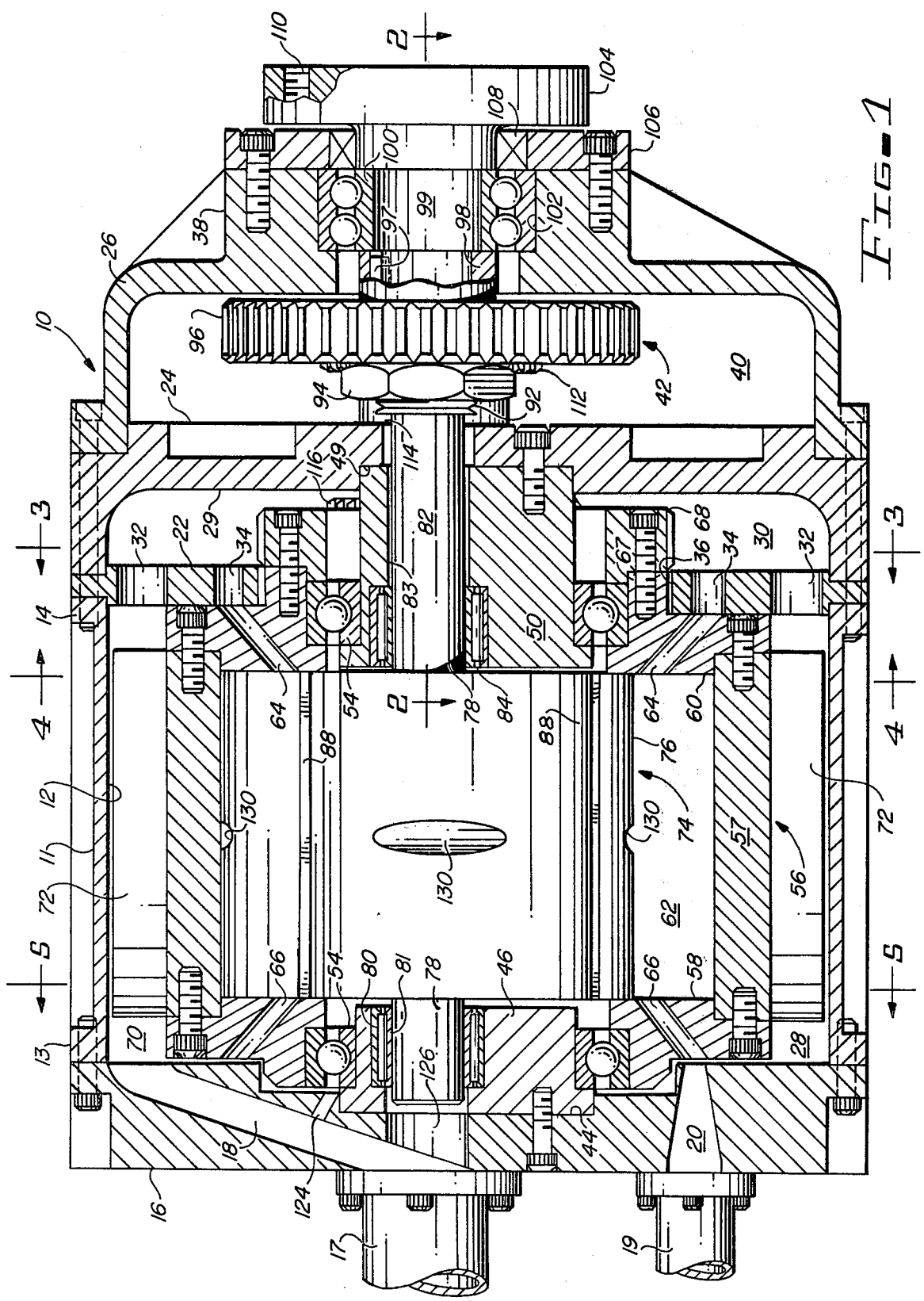
FIG. 1 is a sectional view taken longitudinally through the rotary internal combustion engine of the present invention and illustrating the various features thereof.

Referring more particularly to the drawings, FIG. 1 best illustrates the engine housing 10 as having a main body portion 11 which is shown as being of cylindrical configuration with a central bore 12 formed therethrough and having suitable flanges 13 and 14 formed on its opposite ends. An end plate 16 is sealingly mounted on the main body 11 such as with suitable bolts which fasten the end plate 16 to the flange 13 and thereby close that end of the bore 12 of the main body.

A suitable fuel supply conduit 17 is bolted, or otherwise attached to the exterior surface of the end plate 16 for supplying a fuel mixture from a remote source (not shown) to a fuel inlet passage 18 formed in the end plate. Likewise, a suitable exhaust pipe 19 is attached to the end plate 16 for receiving spent exhaust gasses directed thereto by an exhaust port 20 formed in the end plate. As will hereinafter be described in detail, the fuel inlet passage 18 and the exhaust port 20 are configured so as to open into the bore of the main body 11 at specific locations.

As shown, the opposite end of the main body 11 of the engine housing 10 has three housing elements, or members attached to the flange 14 thereof, with the innermost member, i.e., the one closest to the flange 14, being a fuel porting partition 22, the intermediate member being a support partition 24, and the outermost member being an end cover 26.

The fuel porting plate, or partition 22, closes the opposite end of the bore 12 of the main body portion 11 to define, in conjunction with the main body 11 and the end plate 16, a chamber 28 which will hereinafter be referred to as the rotation chamber 28 for reasons which will become apparent as this description progresses.

The support partition 24 is formed with a substantially dish-shaped surface 29 which faces toward the fuel porting partition 22 so that they cooperatively define a fuel induction chamber 30.

Figure 3:
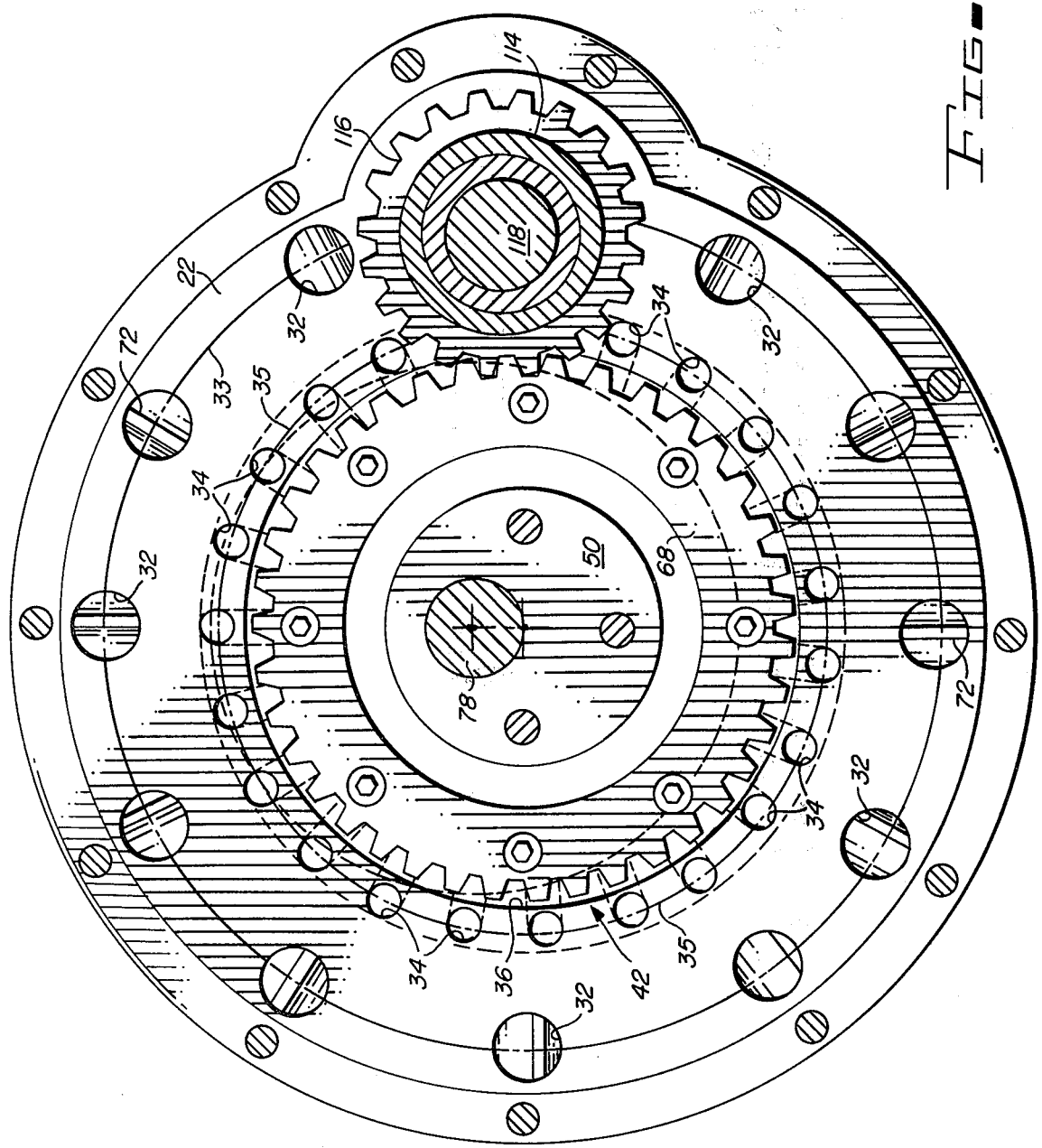
FIG. 3 is a sectional view taken along the line 3—3 of FIG. 1.

As will hereinafter be described in detail, the fuel porting partition 22 is formed with a first plurality of fuel transfer ports 32 which, as seen best in FIG. 3, are positioned in radially spaced increments about a circular centerline 33, the diameter of which is sized to place those ports 32 adjacent the periphery of the fuel porting partition. A second plurality of fuel transfer ports 34 are formed through the fuel porting partition 22 and are positioned in radially spaced increments on a concentric circular centerline 35 the diameter of which is smaller than the diameter of the centerline 33. The fuel porting partition 22 also is formed with a relatively large central opening 36.

The end cover 26 is of substantially dish-shaped configuration having an end wall from which a bearing boss 38 extends. The end cover 26 and the support partition 24 cooperatively define a cavity 40 in which part of a gear train 42 is contained as will hereinafter be described.

The end plate 16 is provided with a centrally located shallow recess 44 formed in the inwardly facing surface thereof and a plug-shaped bearing body 46 is mounted in the recess such as with suitable screws. The bearing body 46 has a cylindrical peripheral surface and is disposed to extend coaxially into the rotation chamber 28 of the engine housing 10. Similarly, the support partition 24 is provided with a relatively shallow recess 49 formed therein and a plug-shaped bearing body 50 is fixedly carried therein such as with suitable screws. The bearing body 50 is formed with a cylindrical peripheral surface and is disposed to extend through the central opening 36 of the fuel porting partition 22 coaxially into the rotation chamber 28 of the engine housing 10. The bearing bodies 46 and 50 are in spaced apart axial alignment with respect to each other, and each have a suitable bearing 54 carried on their respective peripheral surfaces. The bearings 54 carry a rotor chamber casing 56 so that it is journalled for rotation about the axis of the rotation chamber 28 of the engine housing 10.

The rotor chamber casing 56 includes a cylindrical sleeve-like body 57 on which a first end plate 58 is mounted, and this end plate 58 has a central bore which is in circumscribing engagement with the bearing 54 carried by the bearing body 46 mounted in the end plate 16 of the engine housing. A second end plate 60 is mounted on the opposite end of the sleeve-like body 57 and has a central bore which is in circumscribing engagement with the bearing 54 on the bearing body 50 mounted in the support partition 24 of the engine housing 10. The sleeve-like body 57 and the end plates 58 and 60 define a rotor chamber 62 formed in the rotor chamber casing 56. The second end plate 60 is formed with a plurality of fuel inlet ports 64 which, as seen best in FIG. 4, are arranged in a circular array which is concentric with the axis of the rotor chamber casing 56. The first end plate 58 is provided with exhaust ports 66 as shown best in FIG. 5.

The second end plate 60 of the rotor chamber casing 56 has a coaxially extending circular rim 67 extending integrally therefrom through the central opening 36 of the fuel porting partition 22 of the engine housing 10, and a driven ring gear 68 is bolted, or otherwise mounted on the extending end of the circular rim 67 so as to be disposed in the fuel induction chamber 30 of the engine housing 10. The ring gear 68 is part of the hereinbefore mentioned gear train 42 which is employed for rotational driving of the rotor chamber casing 56 as will be described in detail.

The outside diameter of the rotor chamber casing 56 is smaller than the inside diameter of the main body portion 11 of the engine housing 10. Therefore, an annular passage 70 is provided about the periphery of the rotor chamber casing 56 within the rotation chamber 28 of the engine housing 10. The cylindrical sleeve-like body 57 of the rotor chamber casing 56 is provided with a plurality of helical impeller blades 72 extending radially therefrom so as to extend into the annular passage 70. When the rotor chamber casing 56 is being rotatably driven, in the manner to be hereinafter described, the impeller blades 72 will produce a negative static pressure which is felt at the fuel inlet passage 18 of the end plate 16, thus, drawing fuel into the annular passage 70. The rotating impeller blades 72 will discharge the fuel mixture under pressure through the first plurality of fuel transfer ports 32 of the fuel porting partition 22. Thus, the supercharged fuel mixture is supplied to the fuel induction chamber 30 of the engine housing 10.

A rotor assembly 74 is eccentrically mounted for rotation in the engine housing 10 and includes a rotor body 76 positioned in the rotor chamber 62 and having a cylindrical peripheral surface and end surfaces which are in sliding engagement with the inner surface of the end plates 58 and 60 of the rotor chamber casing 56. The rotor body 76 is attached, such as by a key 77 shown in FIG. 4, for rotation with a shaft 78. One end of the shaft 78 extends into a bore 80 formed eccentrically through the fixed bearing body 46 and is rotatably journalled therein in a suitable bearing 81. The other end 82 of the shaft 78, which is the power output end, extends through an eccentric bore 83 formed through the fixed bearing body 50 in which a suitable bearing 84 is mounted. Thus, the rotor chamber casing 56 is seen to be journalled for rotation about the central axis of the axially aligned bearing bodies 46 and 50 and the rotor assembly 74 is rotatable about an eccentric axis which is defined by the axially aligned eccentric bores 80 and 83 of the bearing bodies 46 and 50 respectively.

The rotor body 76 is formed with a plurality of longitudinally extending radial slots 86. In the illustrated embodiment, there are four of these slots 86 but that number is understood as not being intended as a limitation of the invention. A vane 88 is radially slidably carried in each of the slots 86 and divides the periphery of the rotor body 76 into a plurality of combustion chambers 90 as seen best in FIGS. 4 and 5. As is well known in the radial engine art, the extending ends, or tips, of the vanes 88 are held in sealing engagement with the bore of the cylindrical body 57 of the rotor chamber 62 of the rotor chamber casing 56, in the manner best seen in FIGS. 4 and 5. When the engine is running, centrifugal force will hold the vanes 88 in the proper position, and this force is usually augmented in some manner such as by utilizing springs (not shown) in the bottom of the radial slots, diverting some of the combustion pressures into the slots or the like. Since various techniques are usable, and are well known, the force augmenting devices are omitted from the drawings for clarity.

The output end 82 of the shaft 78 extends from the eccentric bore 83 of the of the fixed bearing body 50, passes through a central hole formed in the support partition 24 and has a diametrically enlarged threaded portion 92, upon which a suitable nut 94 is carried. The nut 94 is in bearing engagement with one surface of a drive gear 96 which forms part of the hereinbefore mentioned gear train 42. The drive gear 96 has a central bore through which the shaft 78 passes, and a key 97 carried in an integral axially extending boss 98 of the drive gear 96 is used to fixedly attach the drive gear to the shaft 78. The nut 94 holdingly presses the end of the boss 98 into engagement with the shoulder of a diametrically enlarged portion 99 of the shaft 78. A suitable bearing 100 is carried on the enlarged portion 99 of the shaft 78 and is mounted in the bore 102 formed in the bearing boss 38 of the end cover 26 of the engine housing 10. A mounting flange 104 is integrally formed on the extreme end of the shaft 78 and that flange protrudes through a plate 106 which is bolted on the end of the bearing boss 38. A suitable shaft seal 108 is carried in a central hole formed in the plate 106 to prevent gas leakage around the shaft 78. The flange 104 may be of any suitable configuration, such as having a plurality of internally threaded holes 110 (one shown) by which rotary power from the engine may be coupled to a suitable mechanism (not shown) which is to be driven by the engine of the present invention.

Figure 2:
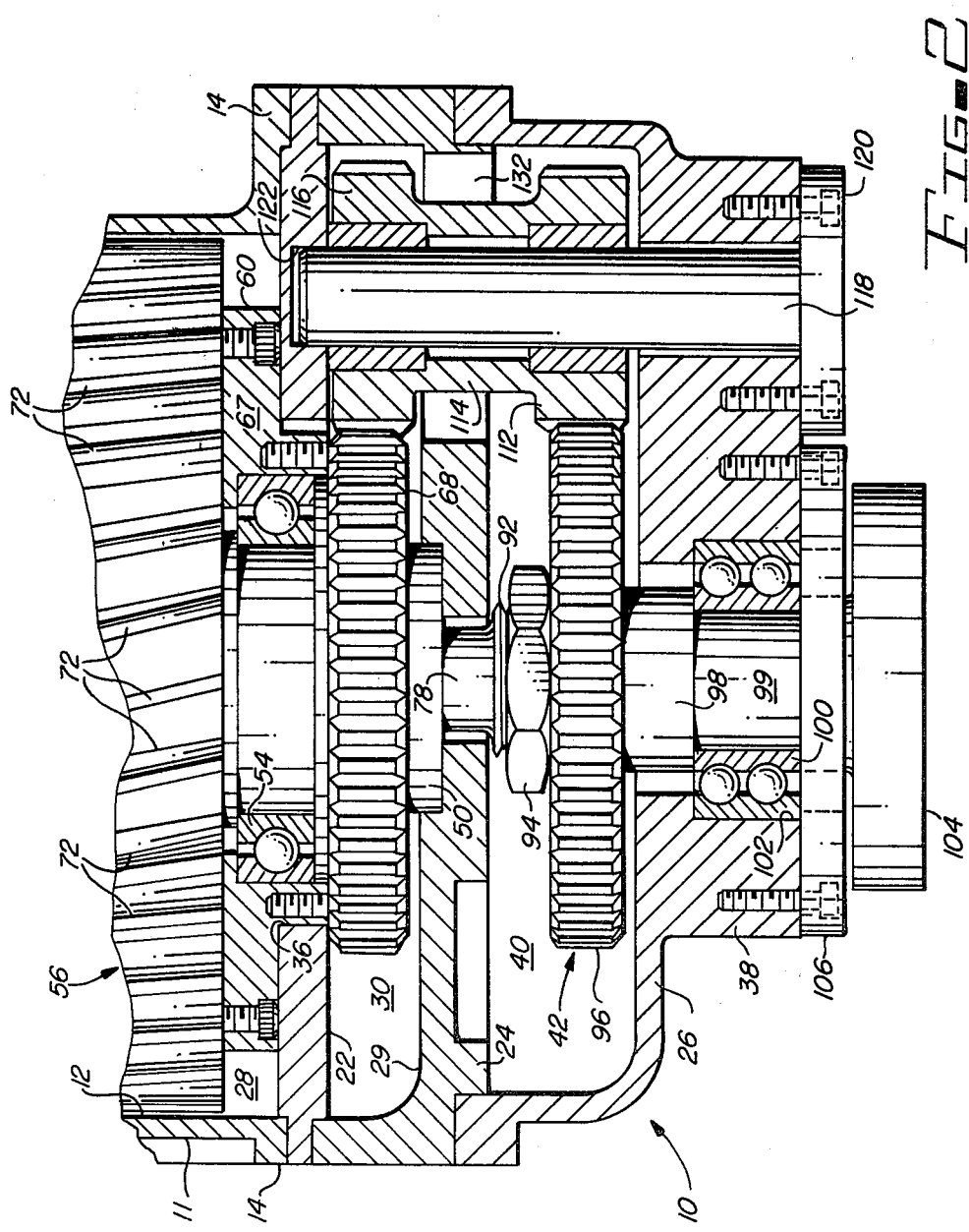
FIG. 2 is a fragmentary sectional view taken along the line 2—2 of FIG. 1.

Reference is now made in particular to FIG. 2 wherein it will be seen that the drive gear 96 carried fast on the shaft 78, is in meshed engagement with a gear 112 formed integrally on one end of a countershaft gear 114. The gear 116 provided on the opposite end of the countershaft gear 114 is in meshed engagement with the driven ring gear 68 fixedly carried on the rotor chamber casing 56. The countershaft gear 114 is rotatably carried on a stub shaft 118 one end of which is fixedly attached as at 120 to the end cover 26 with the other end being supported in a blind bore 122 formed in the fuel porting partition 22.

The drive gear 96, countershaft gear 114 and the ring gear 68 form the gear train 42 which couples the rotary power provided by the rotory assembly 74 to the rotor chamber casing 56 so that the rotor assembly 74 and the rotor chamber casing 56 revolve at the same speed during engine operation.

Operation

While the manner in which the subject engine operates is believed to be obvious which the illustration of the drawings and description of the parts set forth above, it is briefly described as follows:

When the engine is configured to run on gasolene, as will hereinafter be described, a lubricating oil premixed with the gasolene would be needed as is common in most known 2 cycle engines, or a lubrication injection system (not shown) could be used to inject the lubrication into the gasolene as it enters into the engine.

The engine is started by imparting initial rotation to the rotor shaft 78 in any suitable manner. Although not shown, the engine of the present invention may be provided with a suitable starter motor which is coupled to the rotor shaft 78 in any convenient manner. This initially imparted rotary motion will draw fuel into the intake passage 18 of the end plate 16 and this lubricates the bearings 54 and 81 located at the end of the engine by means of the passages 124 and 126 shown in FIG. 1. The fuel is drawn from the intake passage 18 into the annular passage 70 by the impeller blades 72 provided on the periphery of the rotor chamber casing 56. The impeller blades 72 expell the fuel from the annular passage 70 under pressure through the fuel transfer ports 32 for charging the fuel induction chamber 30.

The fuel under pressure in the fuel induction chamber 30 passes through the aligned and open fuel transport ports 34 of the fuel porting partition 22 and the fuel inlet ports 64 of the end wall 60 of the rotor chamber casing 56. Referring in particular to FIG. 4, the above described aligned and open ports are those located in the lower two quadrants of the circular in cross section rotor chamber 62. The open ports which are in communication with the combustion chamber 90 shown as being positioned in the bottom right hand quadrant, are admitting fuel to that combustion chamber for purging exhaust gasses therefrom through the exhaust port 66 (FIG. 5) of the other end plate 58 of the rotor chamber casing 56. The combustion chamber 90 located in the bottom left hand quadrant is closed as far as the exhaust port 66 is concerned and thus, the incoming fuel will charge that combustion chamber. The combustion chamber 90 positioned in the upper left hand quadrant, which was charged with fuel when it was positioned in the bottom left hand quadrant, has undergone a volumetric contraction due to the eccentric rotational axis of the rotor assembly 74, and is thus compressing the fuel mixture charge in that combustion chamber. The combustion chamber 90 which is shown as being positioned in the upper right hand quadrant, is shown in the power portion of its rotational movement, i.e., it was previously charged with fuel, compressed the charge and is now shown in the combustion position of its operating cycle. The ignition associated with such combustion will hereinafter be described in detail. The combustion chamber 90 shown in the bottom right hand quadrant has completed its combustion portion of the rotational cycle has is volumetrically expanding as it moves into a position which opens the exhaust port 66 thus scavenging the spent exhaust gasses as hereinbefore mentioned.

The rotational output applied in this manner to the output shaft 78 of the rotor assembly 74 is fed back by means of the gear train 42, so that the rotor chamber casing 56 is driven at the same speed as the rotor assembly 74. This results in an almost complete absence of relative rotational movement of the vanes 88 with respect to the bore of the rotor chamber 62. Due to the eccentric relationship of the rotational axes of the rotor and the rotor chamber casing, the tips of the vanes will rotatably advance and rotatably retract once for each ½ revolution of the rotor 74 and the rotor chamber casing 56, and the amount of relative movement is determined by the off-set distance between the two axes of rotation. In the illustrated example seen best in FIGS. 4 and 5, the relative movement of the vane tips is about 4° in the advance direction and 4° in the retard direction, therefore, for each 180° of rotation of the rotor and the rotor chamber casing, the total relative rotational movement of the tips of the vanes 88 in the bore of the rotor chamber casing will be about 8°. Due to this relatively small amount of relative rotational movement, frictional losses and frictional wear on the tips of the vanes 88 will be held to a minimum.

As seen best in FIG. 4, the periphery of the rotor body 76 is divided into four equal arcuate segments by the vanes 88, and each of these arcuate segments is formed with a transfer channel 130 each of which is a chord-like groove positioned transversely across the crown of its arcuately curved portion of the periphery of the rotor body 76.

The transfer channels 130 are employed to prevent the engagement of the crown portion of the arcuate peripheral surface of the rotor body with the bore of the rotor chamber casing 56 from separating the combustion chambers 90 into leading and trailing segments during the combustion portion of their rotational cycles. In the absence of the transfer channels 130, uneven or incomplete combustion could occur, and combustion occuring in the trailing portion would exert a rotational force on the trailing one of the vanes 88 which is opposite to the rotation of the rotor assembly 74.

Combustion begins at approximately 10° before the top dead center position of the trailing vane of the combustion chambers 90, and that trailing vane quickly reaches top dead center with the combustion produced forces being transferred through the transfer channel 130 into the leading portion of the combustion chamber to exert proper rotational forces on the leading vane of the combustion chamber. When the exhaust port 66 begins to open, approximately 5% to 7% of combustion pressures remain in the volumetrically expanding combustion chamber, and this, in conjunction with the cone-shaped exhaust port 20 (FIG. 1) of the end plate 16 causes very rapid purging of the spent gasses.

As best seen in FIG. 1, the bearings 54 and 84 located proximate the front of the rotor body 76 and the gears 68 and 116 of the gear train 42 will be lubricated by the oil of the fuel mixture contained in the fuel induction chamber 30. As seen in FIG. 2, the support partition 24 is open as at 132, thus providing lubrication for the gears 96 and 112 of the gear train 42 and for the bearing 100.

The engine can be configured with a relatively lower compression ratio, which matches the lower flash point of gasolene fuel, so that the engine could operate on self-ignition of a gasolene/oil mixture. It will also be appreciated that by mounting a spark plug (not shown) in the end plate 16 of the engine housing 10 and forming suitable spark ports in the end plate 58 of the rotor chamber casing 56, the engine of the present invention could be configured to operate with a conventional spark-type ignition system.

While the principles of the invention have now been made clear in an illustrated embodiment, there will be immediately obvious to those skilled in the art, many modifications, of structure, arrangements, proportions, the elements, materials, and components used in the practice of the invention, and otherwise, which are particularly adapted for specific environments and operation requirements without departing from those principles. The appended claims are therefore intended to cover and embrace any such modifications within the limits only of the true spirit and scope of the invention.

What I claim is:
1. A rotary internal combustion engine comprising:
   (a) an engine housing including,
   I. a main body portion having a bore which forms a rotation chamber,
   II. an end plate mounted on one end of the main body portion for closing thereof, said end plate having a fuel inlet passage formed therethrough for receiving a fuel mixture from an external supply thereof and directing it into the rotation chamber, said end plate having an exhaust port formed therethrough through which spent exhaust gases exit said engine housing,

III. a fuel porting partition mounted at the opposite end of said main body portion and having a first plurality of fuel transfer ports formed therethrough which are disposed to lie in spaced increments on a circular centerline adjacent the periphery of said fuel porting partition and having a second plurality of fuel transfer ports formed therethrough which are disposed to lie in spaced increments about a circular centerline of reduced diameter, IV. a support partition mounted on the opposite end of said main body portion with said fuel porting partition interposed therebetween, said support partition configured to provide a fuel induction chamber between said fuel porting partition and said support partition, said fuel induction chamber for receiving the fuel mixture from said rotation chamber through the first plurality of fuel transfer ports of said fuel porting partition and directing the received fuel mixture into said second plurality of fuel transfer ports of said fuel porting partition, V. an end cover mounted on the opposite end of said main body portion with said fuel porting partition and said support partition interposed therebetween, said end cover configured to form a chamber between said support partition and said end cover;

(b) a rotor chamber casing having a rotor chamber therein, said rotor chamber casing journaled for rotation within the rotation chamber of said engine housing;

(c) a rotor assembly journaled for rotation about an axis which is eccentric with respect to the rotational axis of said rotor chamber casing, said rotor assembly including, I. a rotor body positioned within the rotor chamber of said rotor chamber casing, II. at least a spaced pair of radially reciprocal vanes mounted in said rotor body to form a combustion chamber therebetween, III. an output shaft fast with said rotor body for rotation therewith and extending axially from said rotor body, said output shaft having an elongated power output end; and (d) means connected between said rotor assembly and said rotor chamber casing for coupling combustion induced rotary motion of said rotor assembly to said rotor chamber casing so that said rotor chamber casing is driven at the same speed as said rotor assembly.

2. A rotary internal combustion engine as claimed in claim 1 and further comprising:

(a) said rotation chamber of said engine housing being of circular cross section;

(b) said rotor chamber casing being of circular cross section and coaxial with respect to the rotation chamber of said engine housing;

(c) said rotation chamber of said engine housing having an inside diameter which is larger than the outside diameter of said rotor chamber casing to provide an annular passage therebetween;

(d) means in said engine housing for receiving a fuel mixture from an external supply thereof and directing it through said annular passage to the combustion chamber formed between said pair of radially reciprocal vanes; and (e) a plurality of impeller blades on the periphery of said rotor chamber casing and extending radially therefrom into said annular passage for supercharging the fuel mixture passable therethrough when said rotor chamber casing is being rotatably driven.

3. A rotary internal combustion engine as claimed in claim 1 wherein said means connected between said rotor assembly and said rotor chamber casing includes a gear train.

4. A rotary internal combustion engine as claimed in claim 3 wherein said gear train comprises:

(a) a drive gear mounted fast on said output shaft of said rotor assembly for rotation therewith;

(b) a driven gear mounted fast on one end of said rotor chamber casing for rotation therewith, said driven gear being coaxial with said rotor chamber casing;

(c) a countershaft gear in meshed engagement with said drive gear and with said driven gear; and (d) a stub shaft fixedly carried in said engine housing with said countershaft gear journalled for rotation about the longitudinal axis of said stub shaft.

5. A rotary internal combustion engine as claimed in claim 4 wherein said drive gear and one end of said countershaft gear are located in the chamber formed between said end cover and said support partition and said driven gear and the other end of said countershaft gear are located in the fuel induction chamber formed between said fuel porting partition and said support partition.

6. A rotary internal combustion engine as claimed in claim 1 and further comprising said rotor chamber casing being of cylindrical configuration and having an outside diameter which is smaller than the inside diameter of the rotation chamber of said engine housing to provide an annular passage therebetween, one end of said annular passage being in communication with the fuel inlet passage of said end plate and the other end thereof being in communication with the first plurality of fuel transfer ports of said fuel porting partition.

7. A rotary internal combustion engine as claimed in claim 6 and further comprising a plurality of impeller blades mounted on the periphery of said rotor chamber casing and extending radially therefrom into said annular chamber, so that when said rotor chamber casing is being rotatably driven, said impeller blades will draw the fuel mixture into said annular chamber and expell it under pressure into said fuel induction chamber.

8. A rotary internal combustion engine as claimed in claim 1 wherein said rotor chamber casing comprises:

(a) a cylindrical body having a bore which is the rotor chamber of said rotor chamber casing;

(b) a first end plate mounted on one end of said cylindrical body for closing thereof, said first end plate being adjacent said end plate of said engine housing and having at least one exhaust port formed therein which moves into and out of aligned relationship with the exhaust port of the end plate of said engine housing once for each revolution of said rotor chamber casing; and (c) a second end plate mounted on the opposite end of said cylindrical body adjacent said fuel porting partition and having a plurality of fuel inlet ports formed therethrough in spaced increments on a circular centerline, the fuel inlet ports of said second end plate being aligned with the second plurality of fuel transfer ports of said fuel porting partition.

9. A rotary internal combustion engine as claimed in claim 1 and further comprising:
   (a) a first bearing body fixedly mounted on said end plate of said engine housing and extending axially into the rotation chamber of said engine housing, said first bearing body having an eccentric bore formed therein in which the other end of said output shaft of said rotor assembly is rotatably journalled;
   (b) first bearing means on the periphery of said first bearing body for rotatably supporting one end of said rotor chamber casing;
   (c) a second bearing body fixedly mounted on said support partition and extending through said fuel porting partition axially into the rotation chamber of said engine housing, said second bearing body having an eccentric bore formed therethrough in which an intermediate portion of the elongated power output end of said output shaft of said rotor assembly is rotatably journalled; and
   (d) second bearing means on the periphery of said second bearing body for rotatably supporting the other end of said rotor chamber casing.

10. A rotary internal combustion engine as claimed in claim 1 and further comprising:
   (a) said rotor body of said rotor assembly being of cylindrical configuration; and
   (b) a transfer channel formed transversely across the crown of said rotor body between said pair of vanes.

* * * * *